US005894044A

United States Patent [19]

Norcom et al.

[11] Patent Number: 5,894,044

[45] Date of Patent: Apr. 13, 1999

[54] HONEYCOMB STRUCTURE AND METHOD OF MAKING

[75] Inventors: John D. Norcom; Bradford S. Barron, both of Cincinnati, Ohio

[73] Assignee: The Procter & Gamble Company, Cincinnati, Ohio

[21] Appl. No.: 08/837,585

[22] Filed: Apr. 21, 1997

[51] Int. Cl.$^{6}$ .......... B32B 3/12

[52] U.S. Cl. .......... 428/116; 52/793.1; 156/197; 156/204; 156/474; 428/118

[58] Field of Search .......... 428/116, 118; 156/197, 204, 474; 52/793.1

[56] References Cited

U.S. PATENT DOCUMENTS

| | | | |
|---|---|---|---|
| 2,608,502 | 8/1952 | Merriman | 428/116 X |
| 2,963,128 | 12/1960 | Rapp | 428/182 X |
| 3,082,142 | 3/1963 | Payne et al. | 156/197 |
| 3,086,899 | 4/1963 | Smith et al. | 428/116 X |
| 3,542,636 | 11/1970 | Wandel | 428/186 X |
| 3,966,044 | 6/1976 | Cunningham | 206/427 |
| 4,001,473 | 1/1977 | Cook | 428/116 |
| 4,948,445 | 8/1990 | Hees | 156/196 |
| 5,415,715 | 5/1995 | Delage et al. | 156/197 |
| 5,514,445 | 5/1996 | Delage et al. | 428/116 |

FOREIGN PATENT DOCUMENTS

| | | |
|---|---|---|
| 196 09 309 A1 | 9/1997 | Germany . |
| 57-1417 | 1/1982 | Japan . |
| 4-059230 | 2/1992 | Japan . |
| 7-040134 | 7/1995 | Japan . |
| 2523344 | 5/1996 | Japan . |

*Primary Examiner*—Henry F. Epstein
*Attorney, Agent, or Firm*—Jack L. Oney, Jr.

[57] ABSTRACT

A method of making a honeycomb structure includes the step of intermittently slitting a sheet of material such that longitudinal slits are aligned in alternating staggered rows. Each staggered row has a lateral centerline spaced substantially uniformly from adjacent row centerlines. The longitudinal slits in each staggered row have substantially uniform lateral spaces between each slit. Another step is applying continuous stripes of adhesive laterally across a top side and a bottom side of the sheet such that each stripe is spaced apart longitudinally and centered on a row of slits. The stripes alternate between the top side and the bottom side. Still another step includes pleating the sheet such that pleats run longitudinally. Each pleat has a top fold and a bottom fold aligned with a longitudinal slit. Yet another step involves gathering the pleats together in a closed stack and compressing the stack to cause the stripes of adhesive to bond the pleats together at adhesive contact points. A final step is pulling the pleats laterally apart to generate hexagonal cells having interconnections at the adhesive contact points and openings between the adhesive contact points.

12 Claims, 2 Drawing Sheets

HONEYCOMB STRUCTURE AND METHOD OF MAKING

FIELD OF THE INVENTION

The present invention relates to a medium material for a laminated container board, and more particularly to a honeycomb structure as a replacement for a corrugated medium. Even more particularly, the present invention relates to methods of making a honeycomb structure.

BACKGROUND OF THE INVENTION

Corrugated container board for shipping containers is well known in the packaging art. Such container board has a corrugated paper medium sandwiched between two flat sheets of paper, forming a stiff laminated structure. Corrugated container board is light weight and inexpensive because it is made in a continuous web from three rolls of paper. The corrugations provide bending stiffness and column strength, which are requirements of shipping containers.

A honeycomb structure has recently been substituted for a corrugated medium in order to reduce the weight of the container board and to provide greater flat crush or compression strength and more uniform bending resistance. Corrugated mediums resist bending along an axis perpendicular to corrugations more than they resist bending along an axis parallel to corrugations. Also, corrugations provide no walls within the structure which are perpendicular to the sides of the container or liner board in order to resist side compression. A honeycomb medium has all of its walls perpendicular to the sides of the container board, and because of the cell configuration, bending stiffness is substantially uniform in all directions. Also, within a given thickness of container board, honeycomb cells can be sized as needed to balance container board strength and stiffness with overall container board weight.

Container board may be made from films and other materials besides paper. Regardless of the material used for the medium, an important aspect in the desirability of medium structures is how easily and inexpensively they can be made. Common honeycomb structures are made by stacking layers of material together with staggered parallel stripes of adhesive between them. When the stack is pulled perpendicular to the layers, the layers stick together at the adhesive stripes but fold between stripes to form open polygonal cells. U.S. Pat. No. 5,415,715 issued May 16, 1995 to Delage et al. illustrates this method of making a honeycomb structure. The problem with this method is that it is a batch method and requires cutting perpendicular to the cells through all the layers of material in order to obtain a honeycomb structure thin enough for use as a container board medium. The cutting step tends to damage the honeycomb structure and there is an overall size limitation for such cutting operations. Board made with a honeycomb medium is typically thick and uses heavy paper so that the structure can withstand the cutting operation.

Delage et al. also show an alternative prior art method in which a single sheet of paper is provided with staggered rows of slits. When this sheet is pulled perpendicular to the slits, polygonal cells are opened. However, such cells do not have walls perpendicular to the plane of the slit material. Instead cell walls are angled to the plane depending upon the tension applied to open the cells. Because edges are not perpendicular to the plane of the sheet, this structure does not lend itself to forming a rigid container board medium.

Delage et al. illustrate their invention as a hybrid of the two prior art methods. A stack of layers of cloth or fiber web is "needled" or sewn together and then slit and stretched perpendicular to the slits but parallel to the layers to obtain a honeycomb structure. The stack up of expanded layers provides a cell wall perpendicular to the plane of the layers. Delage et al. then perform a "densification" operation to bond all the layers together in a stretched condition to complete a honeycomb structure which will remain expanded without applying further tension. This method does not lend itself to a simple process for making container board.

What is desired is a method of making a honeycomb medium which is made continuously from a single web of material and which has cell walls perpendicular to the single web of material.

What is also desired is a honeycomb material having sufficient integrity when stretched that adhesive bonds alone are not required to hold cells together.

SUMMARY OF THE INVENTION

In one aspect of the present invention, a method of making a honeycomb structure comprises the step of intermittently slitting a sheet of material such that longitudinal slits are aligned in alternating staggered rows. Each staggered row has a lateral centerline spaced substantially uniformly from adjacent row centerlines. The longitudinal slits in each staggered row have substantially uniform lateral spaces between each slit. The lateral spaces are equal to a thickness dimension of the resulting honeycomb structure. Another step is applying continuous stripes of adhesive laterally across a top side and a bottom side of the sheet such that each stripe is spaced apart longitudinally and centered on a row of slits. The stripes alternate between the top side and the bottom side. Still another step includes pleating the sheet such that pleats run longitudinally. Each pleat has a top fold and a bottom fold aligned with a longitudinal slit. Yet another step involves gathering the pleats together in a closed stack and compressing the stack to cause the stripes of adhesive to bond the pleats together at adhesive contact points. A final step is pulling the pleats laterally apart to generate hexagonal cells having interconnections at the adhesive contact points and openings between the adhesive contact points.

The sheet of material is preferably part of a continuous web having a machine direction either parallel to or perpendicular to the longitudinal slits. The sheet of material is preferably paper and the adhesive preferably adheres more strongly to the paper and to itself than to a process apparatus surface.

In another aspect of the present invention, a honeycomb structure comprises a sheet of material having staggered rows of longitudinally oriented intermittent slits therein. The sheet of material also has lateral stripes of adhesive applied to a top side and a bottom side of the sheet, and the adhesive stripes are spaced apart and alternate on the top side and the bottom side. The sheet is pleated to have longitudinal pleats, which are compressed to connect the pleats to each other at the adhesive stripes. The honeycomb structure is generated by lateral pulling on the pleats to form interconnected cells which are connected at the adhesive stripes by an adhesive bond and by a fold of the pleats. The fold provides sufficient strength to prevent the honeycomb structure from zippering open wherever the adhesive bond is inadequate.

Preferably, the honeycomb structure has a thickness of about 1 mm to about 5 mm, the slits have a length equivalent to half a perimeter of a hexagonal cell, and an adhesive stripe has a width one third the length of the slits, so that each of the hexagonal cells has six sides of substantially equal length.

In yet another aspect of the present invention, a honeycomb container board comprises a top sheet of material bonded to a top surface of a medium, a bottom sheet of material bonded to a bottom surface of the medium, and a honeycomb structure forming the medium and made of a medium material. The honeycomb structure has hexagonal cells joined at two opposing sides by an adhesive bond and by a fold in the medium material. The fold provides sufficient strength to prevent the honeycomb structure from zippering open wherever an adhesive bond between the hexagonal cells is inadequate.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
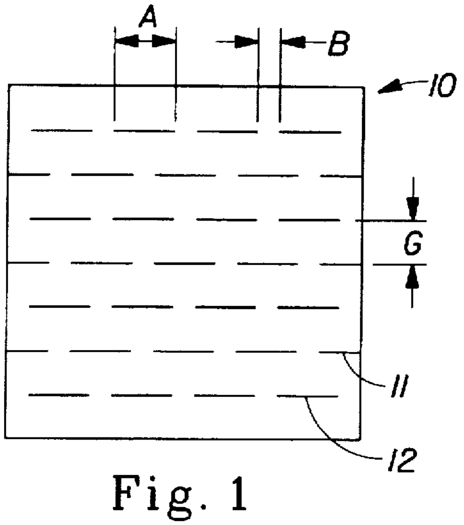
FIG. 1 is a top plan view of a preferred embodiment of the present invention, disclosing a single sheet of material having staggered rows of slits therein.

Referring now to the drawings, and more particularly to FIG. 1, there is shown a preferred sheet of material of the present invention, which is generally indicated as 10. Sheet 10 is preferably made of 0.3 mm thick, 26 lb/1000 sq. ft., unbleached kraft paper. Sheet 10 has alternating staggered rows of slits 11 and 12. Each slit of rows 11 are of length A, except where they intersect the edges of sheet 10. There the slits are approximately two thirds of length A. Each slit of rows 12 are also of length A and staggered half of length A relative to row of slits 11. A gap B between each slit of rows 11 and 12 is approximately equal to one third of length A. Rows of slits 11 are spaced substantially uniformly from rows of slits 12 by a distance G. Distance G is preferably one third of length A or less. Length A is preferably 7 mm, but depends upon the desired cell size, as described hereinafter.

Figure 2:
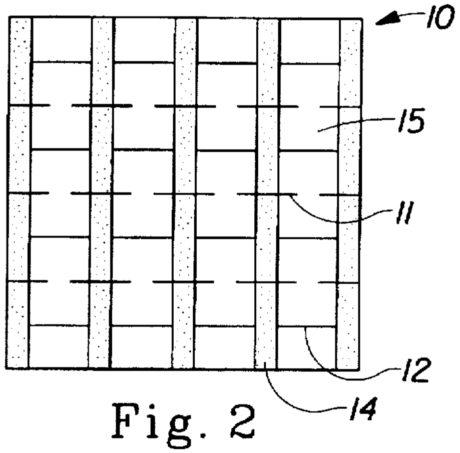
FIG. 2 is a top plan elevation view thereof, showing parallel adhesive stripes applied to the top side of the sheet perpendicular to the slits and spaced such that they pass between the ends of alternating rows of slits and over the centers of the other slits.

FIG. 2 shows sheet 10 having parallel continuous stripes of adhesive 14 running perpendicular to rows of slits 11 and 12 on a top surface 15 of sheet 10. Stripes of adhesive 14 are preferably made of PSA 529, a product of GE Corporation, located in Waterford, N.Y. Stripes are preferably 0.05 thick and 6 mm wide, and are spaced such that they fill gap B between each slit of row of slits 12, and cross through the center of each slit of row of slits 11.

Figure 3:
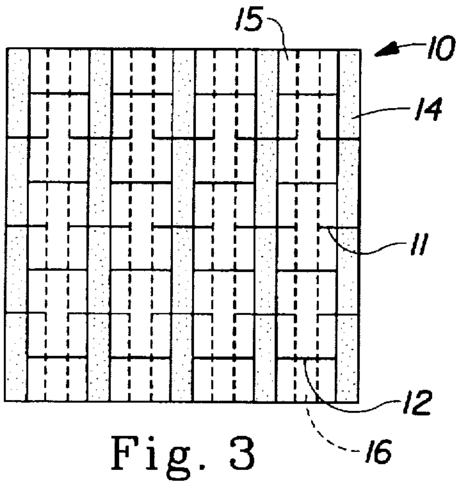
FIG. 3 is a top plan view thereof, showing a set of adhesive stripes applied to the bottom side of the sheet parallel to the top side stripes but evenly spaced between them, such that they pass between the ends of alternating rows of slits and over the centers of the other slits.

FIG. 3 shows sheet 10 having parallel continuous stripes of adhesive 16 parallel to stripes 14 but on a bottom surface 17 of sheet 10. Stripes of adhesive 16 are preferably the same as stripes of adhesive 14, but they are located equidistant between stripes of adhesive 14 such that they fill gap B between each slit of row of slits 11, and cross through the center of each slit of row of slits 12.

Figure 4:
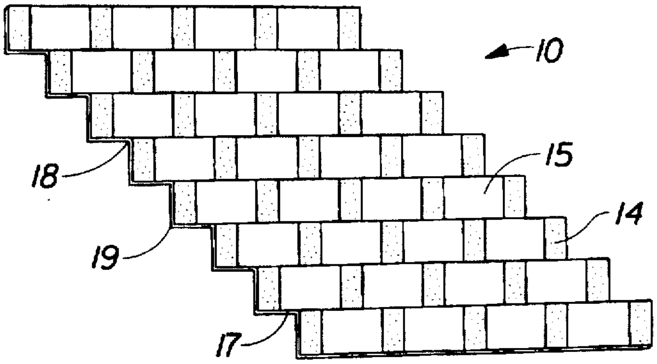
FIG. 4 is a perspective view thereof, showing the sheet pleated along fold lines which are coincident with slits.
Figure 5:
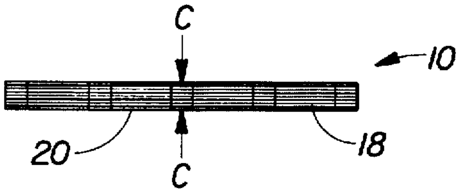
FIG. 5 is a top plan view thereof, showing the pleats gathered and compressed.

FIG. 4 shows sheet 10 being pleated along rows of slits 11 and 12, with pleat fold lines 18 and 19 being co-linear with rows of slits 11 and 12, respectively. FIG. 5 shows sheet 10 folded such that pleats are stacked atop each other to form stack 20, which is compressed by a pressure C, which is preferably about 2.0 kg/sq. cm. This compression is sufficient to cause stripes of adhesives 14 and 16 to adhere to each other and thereby hold stack of pleats 20 together.

Figure 6:
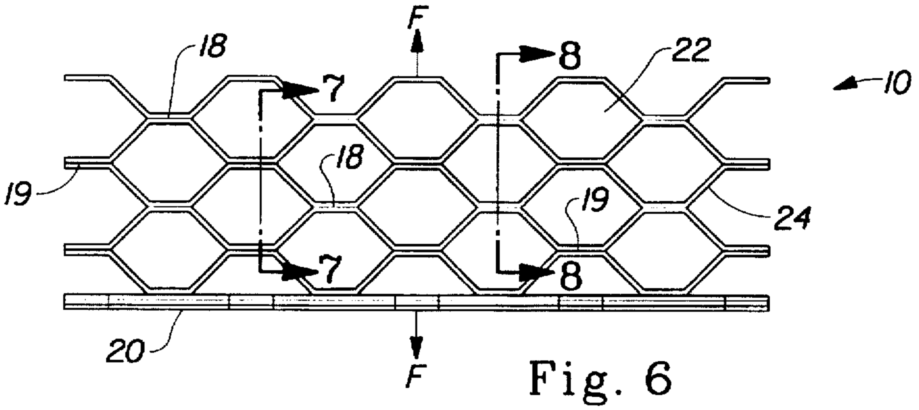
FIG. 6 is a top plan view thereof, showing pleats being pulled from the compressed condition to form hexagonal cells of a honeycomb structure.

FIG. 6 shows pleats being pulled from stack 20 by a force F to generate hexagonal cells 22. Cells 22 have a perimeter substantially equal to twice length A. In FIG. 6, the shorter length sides represent the width of adhesive stripes and are located at adhesive contact points where adhesive holds the pleats together. The other sides of the hexagonal cells have lengths substantially equivalent to the lengths of portions of slits extending beyond each adhesive stripe in rows where adhesive stripes cross the slits. In FIG. 6, the longer sides would be the same length as the shorter sides if the adhesive stripes had width B equal to a third of slit length A, as shown in FIGS. 2 and 3. Thus, there is an inconsistency between FIGS. 2 & 3 and FIG. 6 for illustrative purposes, so that shorter side having an adhesive contact point can be distinguished from longer sides.

Figure 7:
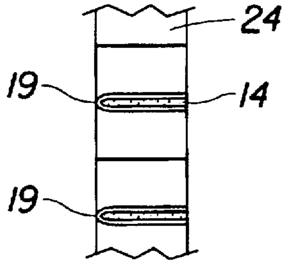
FIG. 7 is a sectioned elevation view thereof, taken along section line 7—7 of FIG. 6, showing pleat folds open at the right and adhesive between the folds.
Figure 8:
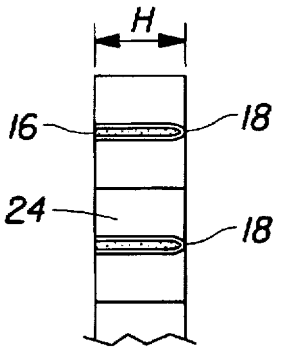
FIG. 8 is a sectioned elevation view thereof, taken along section line 8—8 of FIG. 6, showing pleat folds open at the left and adhesive between the folds.

FIGS. 7 and 8 show exaggerated cross sections of pleats adhesively sealed at folds 18 and 19 by adhesive stripes 14 and 16. Prior art honeycomb structures have only adhesive bonds between hexagonal cells. When a pulling force is applied to open the cells, adhesive bonds may fail, especially if the adhesive is not uniformly applied. Once one adhesive bond fails, the load is distributed among the adjacent bonds. Frequently, a line of bonds will fail sequentially under the added stress. This phenomenon is described as zippering. In the present invention, hexagonal cells 22 are not only bonded together by adhesive, but also folds 18 and 19 are present to withstand pulling force F. Thus, honeycomb structure 24 of the present invention is believed to be more robust than the typical prior art honeycomb structure.

In FIG. 8 there is shown a dimension H, which represents the height or thickness of a honeycomb structure 24 of the present invention. Dimension H is equivalent to dimension G of FIG. 1.

In the process of folding pleats along slits, registration thereof is not as difficult as first imagined because the weakest portion of sheet 10 is along the slit lines where only gaps B hold the sheet together. Thus, it is natural for pleats to fold exactly co-linear with slit lines.

Figure 9:
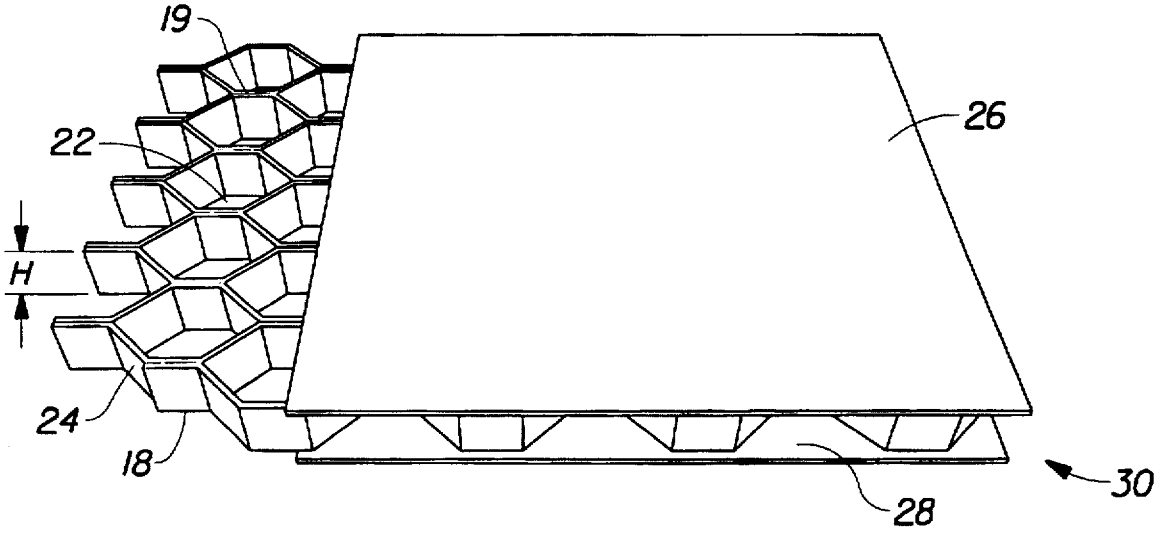
FIG. 9 is a perspective view showing flat top and bottom sheets applied to a honeycomb structure of the present invention.

FIG. 9 shows honeycomb structure 24 with hexagonal cells 22 and folds 18 and 19. Honeycomb structure 24 is sandwiched between a topsheet 26 and a bottomsheet 28, and adhesively bonded to honeycomb structure 24 to form a rigid container board, generally indicated as 30. Topsheet 26 and bottomsheet 28 are preferably 0.4 mm thick and are made of 42 lb/1000 sq. ft., unbleached kraft paper.

When hexagonal cells 22 have equal length sides, container board 30 has a bend resistance and an edge crush resistance which are more uniform in any direction than for corrugated board. Hexagonal cell container board 30 resists significantly greater compression perpendicular to topsheet 26 and bottomsheet 28 than corrugated container board. Yet, container board 30 may be made as thin as and as lightweight as corrugated board because the honeycomb medium is made from a single sheet of material. Honeycomb structure 24 may be made by a continuous process just like corrugated mediums; therefore, it is believed that container board 30 may made as economically and in sizes just as large as for corrugated container board.

Methods of making the honeycomb structure of the present invention include making it in batch form by hand, as illustrated, and making it by continuous web handling processes. The latter may include a process in which the machine direction is either parallel to the slits or perpendicular to the slits. For example, if the machine direction were parallel to the slits, a web would first run through slitting wheels having gaps around their circumferences to account for the gaps between slits. Slitting would be followed by adhesive printing drums on both sides of the web, which would print cross-direction stripes of adhesive. Ring rolls would then progressively pleat the web and side belts would gather the pleats and compress them together laterally. A tentering system would grip outermost pleats and then gradually expand the honeycomb structure laterally. Once expanded, adhesive rolls would apply adhesive to the top and bottom surfaces of the honeycomb structure. Top and bottom sheet webs would thereafter be introduced onto the honeycomb structure in the machine direction and pressure, heat, and/or dwell time would allow bonding to occur to form a continuous web of honeycomb container board.

Alternatively, if the machine direction were perpendicular to the slits, the slits would be formed by mating die and anvil rolls as the web passed between them. Adhesive stripes would be applied in machine direction by ganged glue guns or by printing rolls. Corrugating rolls would initiate pleating and web speed would be slowed to cause pleats to gather between top and bottom guide belts. Aggressive adhesive would minimize compression needed to cause pleats to bond together at adhesive stripes. Web speedup would act to expand the honeycomb structure in the machine direction. Thereafter, adhesive would be applied to top and bottom surfaces of the honeycomb structure and top and bottom sheet webs would be introduced onto the honeycomb structure in machine direction and be bonded in place by pressure, heat, and/or dwell time to form a continuous web of honeycomb container board.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention. For example, materials such as polymeric films and nonwovens and cloth can be substituted or mixed with paper to form the honeycomb structure and container board of the present invention. Different adhesives, such as hot melts and latex emulsions can be used to bond pleats together. Pleats could even be fusion welded at one side of the sheet of material and then fusion welded at the opposite side of the material, with welds alternating from side to side. Hexagonal cells may have various opening sizes and side lengths within each cell by varying slit lengths, gaps between slits, adhesive stripe widths and locations relative to slits. Hexagonal cell height may be varied from about 7 times to about 100 times the sheet material thickness without losing structural integrity or the ability to form pleats.

What is claimed is:

1. A method of making a honeycomb structure comprising the steps of:

a) intermittently slitting a sheet of material such that longitudinal slits are aligned in alternating staggered rows, each staggered row having a lateral centerline spaced substantially uniformly from adjacent row centerlines, said longitudinal slits in each staggered row having substantially uniform lateral spaces between each slit, said lateral spaces being twice a thickness dimension of said resulting honeycomb structure;

b) applying continuous stripes of adhesive laterally across a top side and a bottom side of said sheet such that each stripe is spaced apart longitudinally and centered on a row of slits, said stripes alternating between said top side and said bottom side;

c) pleating said sheet such that pleats run longitudinally, each of said pleats having a top fold and a bottom fold aligned with a longitudinal slit;

d) gathering said pleats together in a closed stack and compressing said stack to cause said stripes of adhesive to bond said pleats together at adhesive contact points; and e) pulling said pleats laterally apart to generate hexagonal cells having interconnections at said adhesive contact points and openings between said adhesive contact points.

2. The method of claim 1 wherein said sheet of material is part of a continuous web having a machine direction parallel to said longitudinal slits.

3. The method of claim 1 wherein said sheet of material is part of a continuous web having a machine direction perpendicular to said longitudinal slits.

4. The method of claim 1 wherein said sheet of material is paper and said adhesive adheres more strongly to said paper and to itself than to a process apparatus surface.

5. A honeycomb structure comprising a sheet of material having staggered rows of longitudinally oriented intermittent slits therein, said sheet of material also having lateral stripes of adhesive applied to a top side and a bottom side of said sheet, said adhesive stripes being spaced apart and alternating on said top side and said bottom side, said sheet being pleated to have longitudinal pleats, said pleats being compressed to connect said pleats to each other at said adhesive stripes, said honeycomb structure being generated by lateral pulling on said pleats to form interconnected cells, said cells being connected at said adhesive stripes by an adhesive bond and by a fold of said pleats, said fold providing sufficient strength to prevent said honeycomb structure from zippering open wherever said adhesive bond is inadequate.

6. The honeycomb structure of claim 5 wherein said sheet of material is paper and said adhesive adheres more strongly to said paper and to itself than to a process apparatus surface.

7. The honeycomb structure of claim 5 wherein said honeycomb structure has a thickness of about 3 mm to about 100 mm.

8. The honeycomb structure of claim 5 wherein said slits have a length equivalent to half a perimeter of a hexagonal cell and an adhesive stripe has a width one third said length of said slits, so that each of said hexagonal cells has six sides of substantially equal length.

9. A honeycomb board comprising:

a) a top sheet of material bonded to a top surface of a medium;

b) a bottom sheet of material bonded to a bottom surface of said medium; and c) a honeycomb structure forming said medium and made of a medium material comprising a sheet of material having staggered rows of longitudinally oriented intermittent slits therein, said sheet of material also having lateral stripes of adhesive applied to a top side and a bottom side of said sheet, said adhesive stripes being spaced apart and alternating on said top side and said bottom side, said sheet being pleated to have longitudinal pleats, said pleats being compressed to connect said pleats to each other at said adhesive stripes, said honeycomb structure being generated by lateral pulling on said pleats to form interconnected cells, said cells being connected at said adhesive stripes by an adhesive bond and by a fold of said pleats, said fold providing sufficient strength to prevent said honeycomb structure from zippering open wherever said adhesive bond is inadequate.

10. The honeycomb board of claim 9 wherein said medium material is paper and said top sheet and said bottom sheet are also made of paper.

11. The honeycomb board of claim 9 wherein said honeycomb structure has a thickness of about 3 mm to about 100 mm.

12. The honeycomb board of claim 9 wherein said slits have a length equivalent to half a perimeter of a hexagonal cell and an adhesive stripe has a width one third said length of said slits, so that each of said hexagonal cells has six sides of substantially equal length.

* * * * *